UNITED STATES PATENT OFFICE.

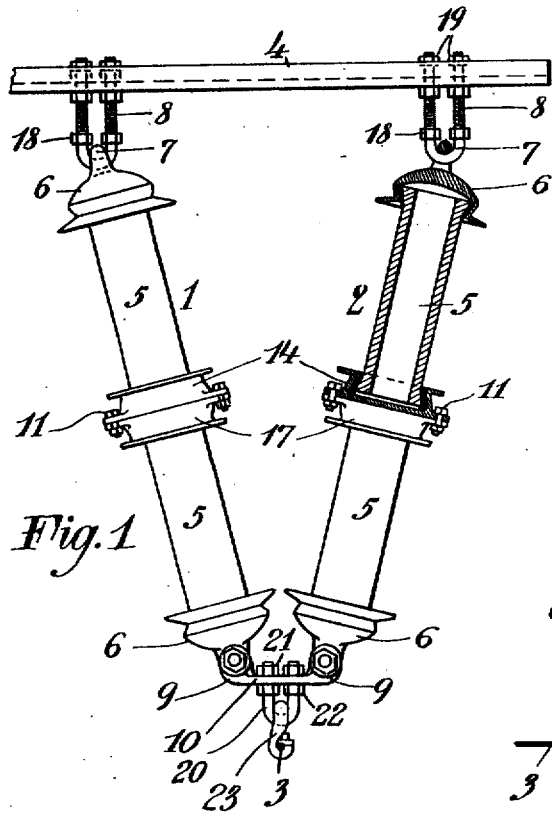
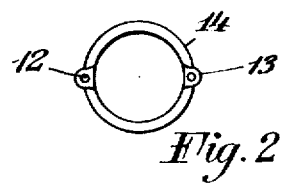
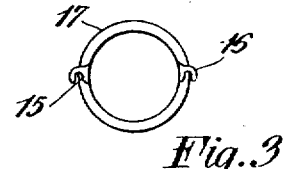
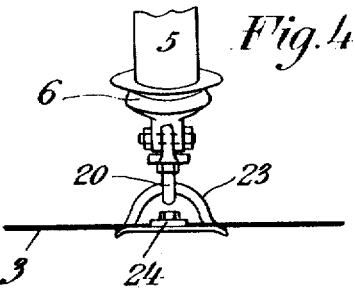
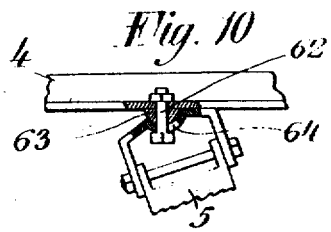

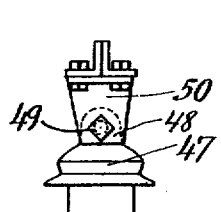
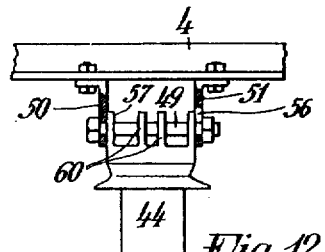
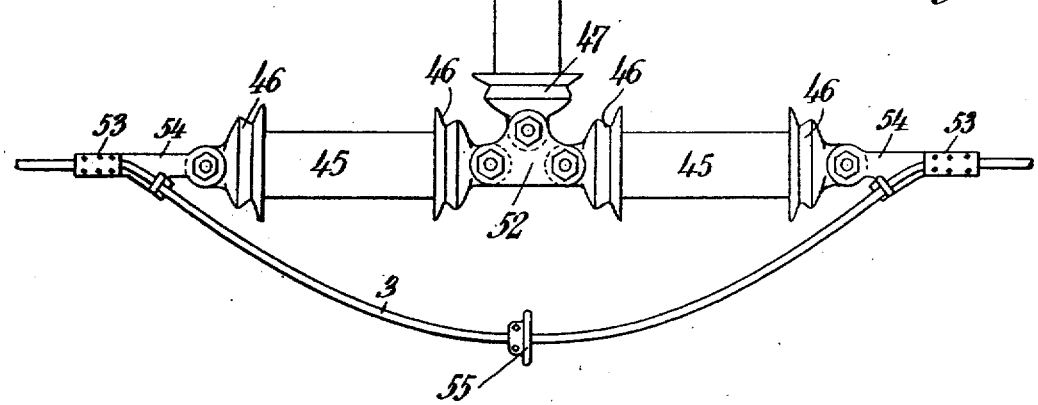
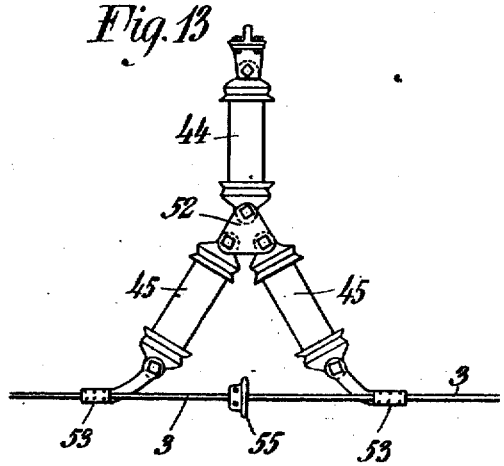
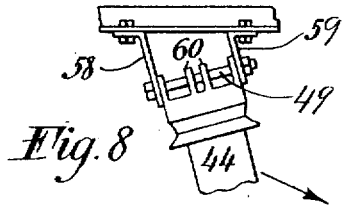
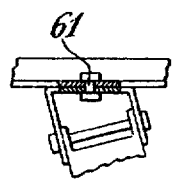

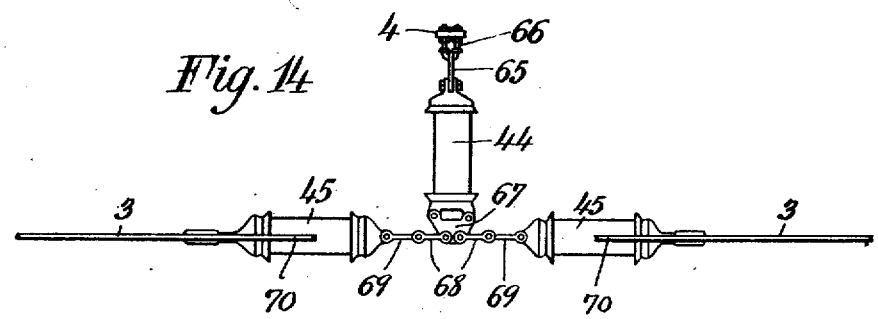
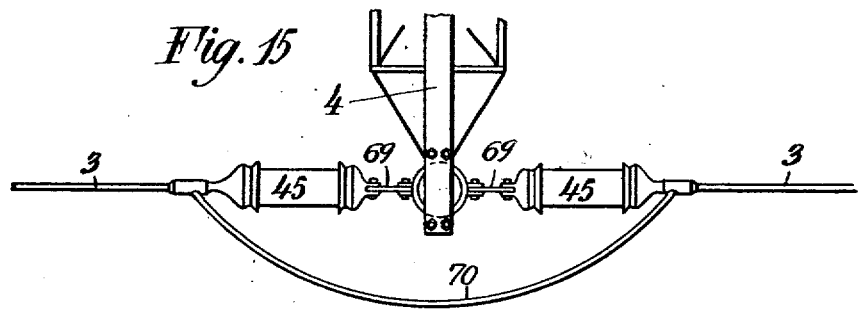
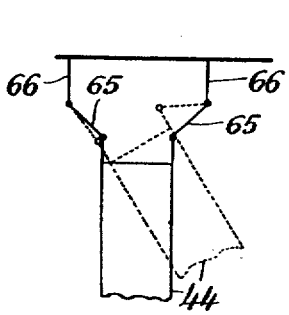
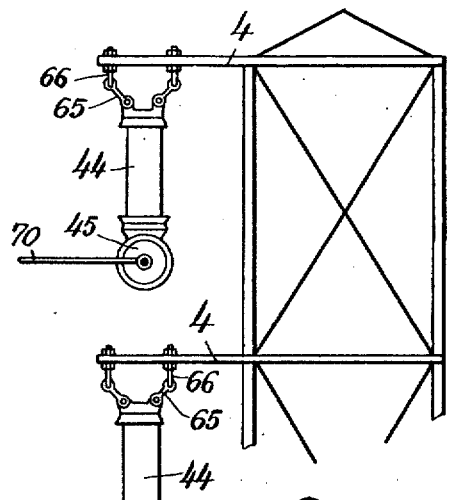

PERCY H. THOMAS, OF UPPER MONTCLAIR, NEW JERSEY.

METHOD OF AND MEANS FOR SUPPORTING ELECTRIC CONDUCTORS.

1,326,307.

Specification of Letters Patent. Patented Dec. 30, 1919.

Application filed November 7, 1914. Serial No. 870,768.

*To all whom it may concern:*

Be it known that I, PERCY H. THOMAS, a citizen of the United States of America, and a resident of Upper Montclair, county of Essex, State of New Jersey, have invented certain new and useful Improvements in Methods of and Means for Supporting Electric Conductors, of which the following is a specification.

In transmission lines designed for the transmission of electric power in large quantities at high voltage, it has been customary to support the electric conductors on what are known as "suspension insulators"; that is to say, the conductor is hung below a rigid support, such as a cross-arm, by means of some insulating device having sufficient strength to sustain the conductor while free to move or swing in any direction as the wind or other forces may drive or pull the conductor. This method possesses a number of great advantages and some disadvantages, among the latter being the necessity of building excessively high and wide supporting poles or towers in order to get the necessary electrical clearance between the conductors and the tower itself. One of the objects of my invention is to provide means of insulating support which does not require so high or wide a tower as the usual multiple unit suspension insulator. My invention also possesses other advantages such as reliability, low cost and a certain amount of flexibility, both in a direction transversely and longitudinally of the line. These and other valuable features of my invention will be seen by reference to the several figures of the accompanying drawings and the description thereof. My invention will also be better understood when taken in connection with the disclosures of my copending applications for patents, Serial No. 767,995, filed May 16, 1913, and Serial No. 787,248 filed August 29, 1913, which show a number of forms of insulators suitable for use with my present invention.

In the following I have described, in connection with the accompanying drawings several illustrative means of practising my invention together with certain modifications.

In the drawings Figure 1 is an elevation of a double insulator, parts being broken away and parts being shown in section; Figs. 2 and 3 are respectively plan views of the inner coöperating connecting means for the inner ends of the insulator elements shown in Fig. 1; Fig. 4 is an elevation of the lower end of a single insulator, the upper part being broken away; Fig. 5 is an elevation of the lower end of a double insulator, the upper part being broken away, showing a modification of the connecting means between the two insulators; Fig. 6 is a diagrammatical view showing the lines of strain when the insulator shown in Fig. 1 is under tension, the full lines showing the strain lines when the parts are under vertical tension and the dotted lines showing the strain lines when the parts are under side tension; Fig. 7 is a diagrammatical view showing a modification in the means of hanging the insulators shown in Fig. 1 and the result in case of a break of one of the two insulators as hereinafter set forth; Fig. 8 is an elevation of the upper end of an insulator and supporting means, the lower part being broken away, showing one way of adapting the principle of my invention in turning corners; Figs. 9 and 10 are views similar to Fig. 8 but showing modifications of the broad idea; Fig. 11 is an elevation, parts being broken away, showing a modified form of my invention in which the insulators are arranged so as to prevent side swinging; Fig. 12 is a side view of the upper portion of the vertical insulator shown in Fig. 11, parts being broken away, showing the suspension means; Fig. 13 is a view (on the somewhat smaller scale) showing a modification of the means illustrated in Fig. 11. Figs. 14, 15 and 16 are views of another modification shown on a smaller scale. Fig. 14 is a side elevation, parts being broken away; Fig. 15 is a top plan view of the same, parts being broken away and Fig. 16 is an end view, parts being broken away. Fig. 17 is a diagrammatic view, on an enlarged scale of the upper part of Fig. 14 showing the relationship under strain.

Similar numerals of reference indicate similar parts throughout the several views.

Referring now to Fig. 1, I show a double insulator comprising two multiple insulators 1 and 2 for supporting the conductor 3 from the cross-arm 4. Each of the insulators comprisese two insulating elements 5, 5, but more or less may be used as desired. Each element consists of a tube of porcelain or equivalent insulator having a metal cap cemented on each end. The caps on the respective ends differ in shape from each other, the caps 6, 6, at the outer ends of the respective elements, each being provided with a projecting eye 7 to receive the U-bolts 8 at the top and to receive the eyes 9 of the link 10 at the bottom, while the caps at the inner ends of the respective elements are adapted to be connected together by means of bolts 11, 11, supported loosely in holes 12 in ears 13 of cap 14, and extending to coöperate with slots 15 in ears 16 on cap 17, the bolts being drawn up conveniently to bolt the adjacent insulator elements together. The U-bolts 8 are screw threaded and provided with nuts 18, 18, to hold the eyes 7 of the caps 6 in place when the insulator is under compression strain. Nuts 19, 19, serve to hold the U-bolts in place on the cross-arm 4. The link 10 carries at its center point a U-bolt 20, held against movement thereon by nuts 21, 22, the U-bolt carrying conductor or cable clamp 23, which latter grips the conductor by means of cover plate 24. The clamp 23 is loosely hung in U-bolt 20 as shown.

When the weight of the conductor 3 only is operating, the insulators remain in the position shown in Fig. 1, the weight being equally divided between the two insulators 1 and 2 and the line of strain being that shown in full lines in Fig. 6.

When, however, there is added to the weight of the conductor a heavy wind pressure on one side of the conductor, the conductor will tend to move to yield to said pressure. Let us assume the pressure comes from the left in Fig. 1. In this case the right hand insulator 2 will be thrown into compression while the left hand insulator 1 will be in tension, the tendency being as shown in dotted lines in Fig. 6, but, because of the method of suspension and the means disclosed, the conductor 3 will not be permitted to move more than a short distance to the right, far less than would be the case were a single insulator used alone to suspend the conductor. This decided decrease in side movement is of great advantage in transmission line work since it permits the cutting down of clearances and hence the sizes of towers and widths of right of way.

The construction above described also has many advantages. Since in view of the considerable diameter of the insulator elements 5, 5, it is not feasible to bring the eyes of the lower caps 6, 6, to a single bolt, which would give an ideal triangle of elements to resist the tendency to deflect the conductor by pure tension or compression stresses in the two insulators 1 and 2, the link 10 is used to connect the insulators and to carry the conductor. This link moreover permits a certain freedom of movement between the insulators and by hanging the conductor clamp 23 a definite distance below a line pasing through the eyes 7, 7, of lower caps 6, 6, the point of equilibrium of the conductor for a resultant pull or pressure on the conductor in any particular direction may be determined. This is illustrated in Fig. 6, wherein, as above set forth, the full lines represent the action of the weight of the cable alone, lines 25 and 26 representing the center lines of the insulators 1 and 2 and the arrows representing the direction of the stresses excited by them. The triangle 27 represents the link 10 and the U-bolt 20 and the arrow 28 the direction of weight of the conductor. The dotted lines in Fig. 6 represent the stresses excited when the conductor is deflected by wind pressure, for example. 31 represents the direction of the resultant pull or pressure on the conductor due to the weight of the conductor and the wind and lines 29 and 30 indicate the resultant position of the insulators 1 and 2, while 32 is the position taken by the link 10. In this position of equilibrium the moment of the pull 31 about the link at the bottom of insulator 1 (line 29) will be equal and opposite to the moment of the force at the bottom of insulator 2 (line 30), now in compression, about the same point. It will be observed that as the direction of the resultant pull 31 changes, the point of equilibrium will change though the change will be small. By varying the depth of the triangle 27 (or 32) the amount of swing permitted may be controlled. The resultant effect is a certain cushioning of the swinging of the conductor, together with a substantial prevention of side motion of the conductor.

Again, the insulators are perfectly free to swing in the direction of the line in case of breaking of the conductor. In such case the conductor clamp will merely tilt in its saddle and the insulators will still be under simple tension stress equally divided. On the other hand should one of the insulators break, the other will carry the conductor and prevent accident. In this latter case the U-bolt 20 will permit the conductor clamp to swing freely when the link 10 drops. Should the conductor break simultaneously with or subsequently to the breaking of one of the insulators, the peculiar construction of the link 10 and clamp 23 is such that no bending or bending moment can be introduced by the movements of the insulator or conductor. The construction of the U-bolt 8, at the top (Fig. 1) in connection with nuts 18, 18, and the mounting of eyes 7, 7, therein, renders said connection perfectly flexible across or with the line, while permitting it to take compression strain without yielding.

In case it is so desired the link 10 may be so constructed as to be bolted firmly to both of the lower caps 6, 6, of the insulators 1, 2, as shown in Fig. 5. In such case the lower eyes 7, 7, on the caps 6, 6, are replaced by flanges 33, 33, to which the link 10, which may be in the form of a plate 34, may be bolted. The plate 34 carries the U-bolt 20 to support the conductor clamp as before. The bearings at the top ends of the insulators in this modification should be in line horizontally so that the insulators, which now form a rigid V may swing in the direction of the line without breaking or straining the parts.

Clearance spaces may be further economized by varying the hanging of the insulators, for instance, as shown in Fig. 7. Here 37 indicates a line through the center of insulator 1 hung from the horizontal portion of cross-arm 35 and 38 a line through the center of insulator 2 hung from a brace 36 oblique to cross-arm 35. This throws the triangle 27 away from the tower, represented by line 43, thus increasing the clearance. In this case the weight of the conductor, when undisturbed or not subjected to wind pressure, is nearly or wholly on insulator 1, but this tension or pull is small and with the wind stress across, both insulators are brought substantially equally into play. Should insulator 1, in this instance, break, insulator 2 will swing into the position shown in dotted lines at 41 or if a wind is blowing toward the tower, to the position shown in dotted line at 42. In this last position 42, which would occur only at the rarest intervals, it will be sufficient if the clearance is only somewhat greater than the jumping distance of the voltage between line and ground, which, with the highest voltages now in commercial use would not be over ten inches.

Furthermore, with the arrangement shown in Fig. 7, if the conductor breaks the insulator pulls out in the direction of the line and the two insulators divide the strain equally, though not in a horizontal plane.

It will be seen from the above that I have provided a double insulator giving the greatest flexibility of motion but having no material side motion, giving support to the line in case of either insulator breaking, and with minimum stresses and maximum clearance of the tower. Furthermore, since this insulator by its very nature cannot be punctured and has arcing rims (see my two co-pending applications for patents referred to above), the presence of two insulators for each position is not an electrical menace while it gives a mechanical relay.

A further advantage of the arrangement shown in Fig. 7 will be seen when it is remembered that for 100,000 volts a clearance, to ground, in the normal position of equilibrium, of about four feet is desirable. On the other hand with the rare and temporary condition of a broken insulator a clearance of thirty inches will be ample, and this is what the insulator 2 in the position 41 will give; even should there be a wind up to forty or fifty miles an hour toward the tower, the deflection will only cut the clearance down to perhaps fifteen inches, which is three times the jumping distance of 100,000 divided by $\sqrt[3]{3} = 58,000$ volts, existing between line and ground.

Furthermore with this general arrangement a broken insulator will be very conspicuous and hence easily detected by a patrolman.

In Fig. 11 I have shown another modification of my invention in which I employ a combination of suspension and strain insulators so arranged as to prevent side swinging. 44 indicates a suspension insulator substantially similar in construction to insulators 1, 2, in Fig. 1; 45, 45 indicate tubes of porcelain or equivalent material carrying metallic caps 46, 46 cemented or otherwise affixed at each end of each tube. 47, 47 indicate similar caps at each end of insulator 44. Each of the respective caps is provided with a perforated lug 48 to receive suitable bolts as hereinafter set forth. Bolt 49 serves to support the device from hangers 50, 51 carried by cross-arm 4. Insulator 44 is thus free to swing in the direction of the line but cannot swing across the line. Conductor 3 is carried around beneath insulator 44 and is further insulated therefrom by insulators 45, 45 which are connected together and supported at their inner ends from insulator 44 by means of link 52 to which the caps of the respective insulators are bolted as shown. Conductor 3 is held to insulators 45, 45 by means of clamps 53 carrying drawbars 54 bolted to the outer caps of the insulators as shown. 55 indicates a disk or horn of suitable material clamped to conductor 3 and adapted to take the burning from any arc that might start in this loop.

The operation of this last described combination is obvious. The conductor is supported with no side motion and with a limited flexibility with the line, thus giving a cushioning effect on shocks and yet not permitting wide swings. If either of insulators 45 break, the conductor is still supported and insulated although the two remaining insulators will swing into line horizontally. The disk 55 is placed near enough to link 52 so that it will form the point where an arc will start so as to protect the conductor from burning.

Part of the strain on horizontal insulators 45, 45 may be relieved by carrying the conductor through taut, as shown in Fig. 13. In this arrangement the insulators 45, 45, may be given any strain intermediate that due to the strain position and that due to the suspension position by shortening or lengthening the length of the intermediate portion of the conductor. This arrangement takes more head room than that shown in Fig. 11, but relieves the insulators of continuously heavy strains.

The tranverse stress on insulator 44 in either the arrangement shown in Fig. 11 or in that shown in Fig. 13 may be relieved by permitting a slight tilt to the insulator under side stress. This may be accomplished by elongating the bolt hole in one or both of the supporting hangers 50 or 51, preferably in that one nearest the tower as shown at 56 in Fig. 12. This means gives a maximum of relief to the porcelain tubes from bending moment for a given sidewise displacement, since the point of support while tilted will be in the left hand portion of lug 48 as at 57.

The same principle of relief from bending moment can be applied to carry the conductor around corners, as shown in Fig. 8. In this arrangement the supporting hangers 58, 59 are of unequal length and the bolt 49 lies at an angle to the horizontal. Since the resultant direction of the pull of the conductor is not nearer than 45° to the horizontal under any but the most adverse conditions, a 22½° tilt of the insulator will greatly reduce the bending moment on the insulator. This insulator is still free to swing in the direction of the line to equalize strains. The insulator shown in Fig. 8 may be used either with or without insulators 45, 45. Lugs 60, 60 are intended to serve to give a central hold on the caps at the ends of the insulators where convenient and assist in taking some of the strain, as in Fig. 8. The bolt hole in hanger 59 may also be somewhat elongated, as shown at 56 in hanger 51 (Fig. 12), in which case strains nearly horizontal will be somewhat less severe on the insulator and, more important still, the insulator then acts as though the center of the swing were on the left hand hanger 58 which will give equilibrium with less movement to the side. The arrow in Fig. 8 indicates the general direction of side pull from the conductor.

Fig. 9 shows a modification of the arrangement shown in Fig. 8, wherein the hanger is all in one piece and swiveled to supporting bolt 61. With this plan should the conductor break, the insulator can pull out in the direction of the line, even at a pole where the conductor is turned at an angle and thus relieve it of all bending strains.

Fig. 10 shows a further modification of the arrangement shown in Figs. 8 and 9. In this plan the hanger is made so that it can tilt through a definite angle in either direction and will then resist side motion. It may also be swiveled to bolt 62, being held and guided by a hemispherical block 63 on the cross-arm 4, fitting into a corresponding recess in the hanger, a slot 64 in the hanger permitting the hanger, as a whole, to tilt around the bolt 62.

In many cases it is desirable to have the towers, insulators and conductors so arranged as to permit the use of a very narrow right of way. Such a scheme is shown in Figs. 14, 15 and 16. Here I have kept down the maximum width of the towers and right of way by setting a limit to the swinging of the vertical element of a combined insulator and by carrying the conductors near together and looping the jumper around the tower.

The complete insulator is in three parts similar to the device shown and described in connection with Fig. 11, each consisting of a tube with a conducting connecting piece at each end. Insulator 44 is hung vertically by two links 65, 65 supported in U-bolts 66, 66 on the cross-arm 4, the links lying in and being movable in a plane transverse to the line. Insulators 45, 45 are connected to plate 67 by interconnecting links 68, 68 and 69, 69, links 68 being bolted to plate 67 and links 69 being carried by eyes in the caps at the inner ends of insulators 45, 45 similar to the means shown at 7, 9 in Fig. 1. The links are loosely connected together by interlocking eyes as shown. Insulators 45, 45, as shown, are thus inserted between the ends of conductor 3 in the adjacent spans, and the bottom of insulator 44, the latter then acting as the common point of support.

The connection formed by links 65 and U-bolts 66, the links being restricted against vertical movement in the U-bolts by suitable nuts (as shown at 18 in Fig. 1), permits the swinging of insulator 44 freely in the direction of the line, while permitting only a certain limited side swing. The amount of this side swing can be varied as shown in Fig. 17 by controlling the length of the links 65, the width of the insulator cap carrying the same and the distance between the U-bolts. When the swing is very limited the transverse stress on the insulator is greater, tending to break it off sidewise. When the swing is wide the transverse stress on the insulator is less but the swing of the conductor is greater. A compromise must be selected in each case as may be most desirable for the case in hand. With certain proportions tried in practice the insulator will swing about 30° and no more when the resultant pull on the conductor is 30° downward from the horizontal. If a less deflection is required the links should be shortened or the U-bolts separated farther. This scheme is advantageous as the forces vary as continuous functions and no dead stop is reached.

The jumper 70 is shown as extending in a horizontal plane or substantially so, and if the horizontal insulators 45, 45, are made to extend beyond the edge of the tower near the cross-arms, it is possible to place the vertical insulator 44 near the tower and still have a good clearance from conductor to tower. The limited side swing of the line prevents the jumper from being brought too near the tower or the cross-arm.

The connection between the inner ends of the three insulators should usually be made to permit the vertical insulator to swing in the direction of the line without binding. The arrangement shown is very effective as where two links, 68, 69, are used, an extreme deflection with the line will not bend the connection.

Where, in the specification and claims, I refer to the insulators "arranged in parallel" I means such an arrangement as is shown in Fig. 1 for example where the insulating elements 5, 5 are arranged "in multiple", end to end, while the insulators 1 and 2, as a whole, are arranged in double form, side by side, i. e. "in parallel".

It is obvious that the drawings and foregoing description are merely illustrative of the general broad principles of the invention and that the details of construction and arrangement shown may be widely varied without departing from the principles of the invention.

What I claim and desire to secure by Letters Patent is:

1. A means for supporting electric conductors comprising a support, and multiple insulators constructed to resist tension and compression arranged in parallel and having separated pivotal connections to said support constructed to provide for longitudinal movement of the conductor and restricted transverse movement.

2. A means for supporting electric conductors comprising a support, and depending multiple insulators constructed to resist tension and compression arranged in parallel and having separated pivotal connections to said support constructed to provide for longitudinal movement of the conductor and restricted transverse movement.

3. A means for supporting electric conductors comprising a support, a pair of insulators arranged side by side and pivotally connected with the support at points spaced from each other, a link connecting the other ends of the insulator and means permitting the insulators to have free movement in the direction of the line but restricted movement across the line.

4. A means for supporting electric conductors comprising a support, a pair of insulators arranged side by side and pivotally connected with the support at points spaced from each other, a link pivotally connected to the other ends of each of said insulators and shorter than the distance of said points of support from each other and means permitting the insulators to have free movement in the direction of the line but restricted movement across the line.

5. A means for supporting electric conductors comprising a support including a horizontal and an oblique portion, a pair of insulators arranged side by side, one of said insulators being connected to the horizontal and one to the oblique portion of the support and a link connecting the other ends of the insulators together, the link being shorter than the distance between the points of support of the insulators.

6. Means for supporting electric conductors comprising a support, a hanger carried thereby, an insulator directly connected to but loosely carried by said hanger, means associated with said hanger for limiting vertical movement of said insulator relative to said hanger and means mounted on the lower end of said insulator for carrying said conductor.

7. Means for supporting electric conductors comprising a support, a pair of insulators arranged in parallel, a hanger for each insulator mounted on said support, a pivotal connection between each insulator and its hanger, means associated with the hangers for limiting the vertical movement of the insulators relative thereto, a link connecting the lower ends of the insulators and means for carrying the conductor mounted on said link.

8. Means for supporting electric conductors comprising a support, a pair of insulators arranged in parallel, a hanger for each insulator mounted on said support, a pivotal connection between each insulator and its hanger, means associated with the hangers for limiting the vertical movement of the insulators relative thereto, a link loosely connected to the lower ends of said insulators and joining them together and means for carrying the conductor mounted on said link.

9. In means for supporting electric conductors a support, a hanger mounted thereon obliquely to said support, an insulator for carrying the conductor and means for mounting the insulator on the hanger.

10. The combination with a support, of a high tension line conductor supported at a distance therefrom, an insulator comprising a body constructed to resist tension and compression and having connections respectively to said support and said conductor, the connection between said insulator and said support including pivotal means constructed to provide for longitudinal and restricted transverse movement of the conductor; and the conductor being transversely pivoted to the insulator.

In testimony whereof I have signed this specification in the presence of two subscribing witnesses.

PERCY H. THOMAS.

Witnesses:
SEABURY C. MASTICK,
HENRY J. LUCKE.